United States Patent [19]
Nakamura

[11] Patent Number: 5,551,589
[45] Date of Patent: Sep. 3, 1996

[54] LOCKING CONSTRUCTION OF ELECTRICAL CONNECTION BOX

[75] Inventor: Masayoshi Nakamura, Yokkaichi, Japan

[73] Assignee: Sumitomo Wiring Systems, Ltd., Yokkaichi, Japan

[21] Appl. No.: 292,980

[22] Filed: Aug. 22, 1994

[30] Foreign Application Priority Data

Oct. 12, 1993 [JP] Japan .................. 5-055046 U

[51] Int. Cl.$^6$ .................................................. B65D 45/16
[52] U.S. Cl. .................. 220/326; 220/4.02; 220/4.21
[58] Field of Search ................... 220/3.2, 3.3, 3.8, 220/4.02, 4.21, 306, 324, 326

[56]  References Cited

U.S. PATENT DOCUMENTS

| | | | |
|---|---|---|---|
| 4,049,357 | 9/1977 | Hamisch, Jr. ................. | 220/4.24 X |
| 4,216,984 | 8/1980 | Hofmann et al. . | |
| 4,431,113 | 2/1984 | Sims, Jr. ...................... | 220/306 |
| 4,635,809 | 1/1987 | Bachman et al. ............. | 220/4.21 |
| 4,896,784 | 1/1990 | Heath . | |
| 5,295,858 | 3/1994 | Kasai et al. . | |

FOREIGN PATENT DOCUMENTS 0663451  12/1951  United Kingdom .
8707670  12/1987  WIPO .

Primary Examiner—Stephen K. Cronin
Attorney, Agent, or Firm—Greenblum & Bernstein P.L.C.

[57]  ABSTRACT

A locking construction of an electrical connection box, comprising: a lower casing member which is made of resin; an upper casing member which is made of resin and is mounted on an upper portion of the lower casing member; a first locking member which has a first engageable face and is provided on the lower casing member; and a second locking member which has a second engageable face engageable with the first engageable face and is provided on the upper casing member; wherein one of the first and second engageable faces of the first and second locking members is formed by two engageable face sections having a predetermined difference in height therebetween such that the engageable face sections are sequentially brought into engagement with the other of the first and second engageable faces of the first and second locking members.

5 Claims, 4 Drawing Sheets

LOCKING CONSTRUCTION OF ELECTRICAL CONNECTION BOX

BACKGROUND OF THE INVENTION

The present invention relates to a locking construction of an electrical connection box which contains electrical connection components such as a blade fuse, a slow blowing fuse, a relay, etc. and includes an upper casing member, e.g., an upper cover and a lower casing member such that the upper cover is mounted on the lower casing member for waterproofing.

FIG. 1 shows one example of a locking construction of a known electrical connection box. The known electrical connection box includes a lower casing member 1 made of resin and an upper casing member 2 or an upper cover. The upper casing member 2 is mounted on the lower casing member 1 so as to cover an upper opening of the lower casing member 1. In order to lock the lower and upper casing members 1 and 2 to each other, two upper locking portions 3, for example, are integrally formed on a front face 2a of the upper casing member 2 so as to downwardly extend like arms, while two lower locking portions 4 having an upwardly opening boxlike shape are formed at positions on a front face 1a of the lower casing member 1 corresponding to those of the upper locking portions 3, respectively.

As shown in FIG. 2, a forwardly extending boss 6 having a wedgy sectional shape is formed at a lower end of each of the upper locking portions 3. An upwardly oriented engageable face 10 is formed on an upper edge of the boss 6. Meanwhile, a rearward extending boss 7 having a wedgy sectional shape is formed on each of the lower locking portions 4. A downwardly oriented mating engageable face 11 is formed on a lower edge of the boss 7 so as to confront the engageable face 10. The upper locking portion 3 rides over the boss 7 of the lower locking portion 4 so as to be inserted into the lower locking portion 4 and the engageable face 10 and the mating engageable face 11 are brought into engagement with each other so as to lock the lower and upper casing members 1 and 2 to each other.

In the known locking construction of the electrical connection box, a proper clearance Co is formed between the engageable face 10 and the mating engageable face 11 as shown in FIG. 2. By setting the clearance Co at, for example, 0.2 to 0.8 mm, the lower and upper casing members 1 and 2 are locked to each other accurately and backlash is not produced at the time of locking of the lower and upper casing members 1 and 2. In order to clarify the clearance Co, the clearance Co is illustrated exaggeratedly in Fig. 2.

However, the upper and lower casing members 1 and 2 may be deformed at the time of their resin molding or distorted at the time of their mounting on a vehicle body. As a result, such a case happens that the clearance Co becomes smaller than the predetermined value referred to above. If the clearance Co becomes smaller than the predetermined value, such an inconvenience is incurred that the lower and upper casing members 1 and 2 are not locked to each other positively or it becomes difficult to lock the lower and upper casing members 1 and 2 to each other.

SUMMARY OF THE INVENTION

Accordingly, an essential object of the present invention is to provide a locking construction of an electrical connection box, in which even if upper and lower casing members are deformed at the time of their molding or distorted at the time of their mounting on a vehicle body, the upper and lower casing members can be locked to each other accurately and can be held in locking state without backlash.

In order to accomplish this object of the present invention, a locking construction of an electrical connection box, according to the present invention comprises: a lower casing member which is made of resin; an upper casing member which is made of resin and is mounted on an upper portion of the lower casing member; a first locking member which has a first engageable face and is provided on the lower casing member; and a second locking member which has a second engageable face engageable with the first engageable face and is provided on the upper casing member; wherein one of the first and second engageable faces of the first and second locking members is formed by two engageable face sections having a predetermined difference in height therebetween such that the engageable face sections are sequentially brought into engagement with the other of the first and second engageable faces of the first and second locking members.

In order to hold the lower and upper casing members in locking state more positively even when only one of the two engageable face sections serves to lock the lower and upper casing members to each other, the second locking member has the engageable face sections and forks to two leg portions extending towards the first locking member such that the engageable face sections are, respectively, formed on the leg portions.

To this end, the first locking member alternatively has the engageable face sections and the second locking member forks to two leg portions extending towards the first locking member such that the second engageable faces having an identical height are, respectively, formed on the leg portions.

In case the predetermined clearance is formed between the first and second engageable faces and one of the first and second engageable faces has the two engageable face sections, one engageable face section having a smaller clearance relative to the other of the first and second engageable faces than the other engageable face section is brought into engagement with the other of the first and second engageable faces so as to hold the lower and upper casing members in locking state. At this time, the other engageable face section having a larger clearance relative to the other of the first and second engageable faces than the one engageable face does not serve to lock the lower and upper casing members to each other.

On the other hand, when the predetermined clearance is not sufficiently formed between the first and second engageable faces due to deformation of the lower and upper casing members at the time of their molding or distortion of the lower and upper casing members at the time of their mounting on a vehicle body, the other engageable face section having the larger clearance is brought into engagement with the other of the first and second engageable faces so as to hold the lower and upper casing members in locking state. At this time, if the second locking member forks to the two leg portions as described above, deflection of one leg portion corresponding to the smaller clearance does not affect the other leg portion corresponding to the larger clearance, so that it is possible to hold the lower and upper casing members in locking state positively.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 3:
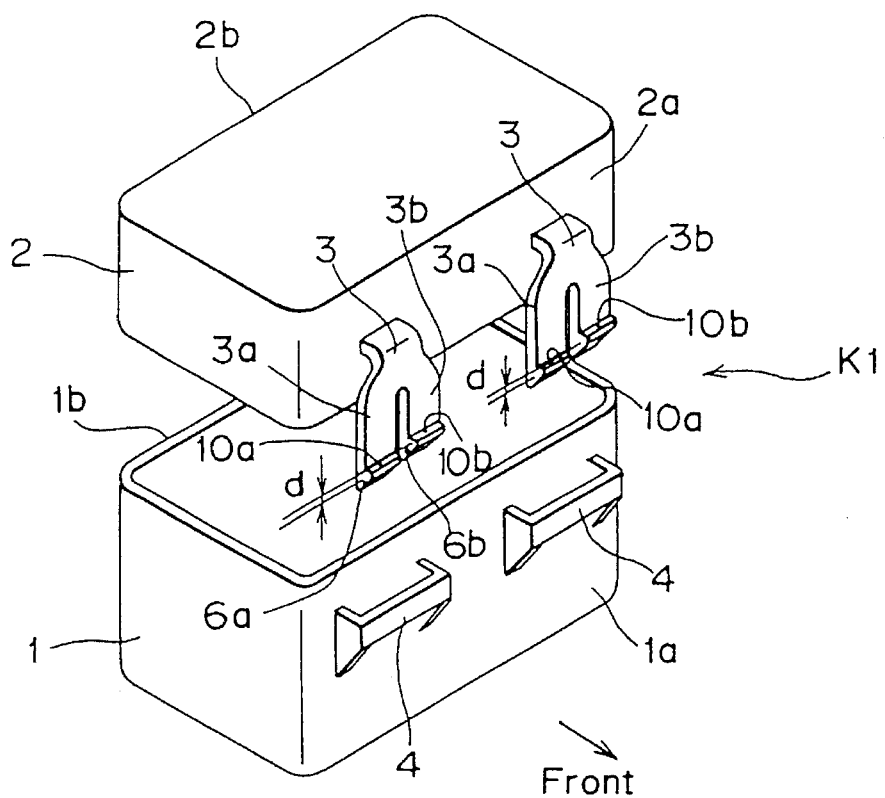
FIG. 3 is a perspective view of an electrical connection box having a locking construction according to a first embodiment of the present invention.

Referring now to the drawings, there is shown in FIGS. 3 to 6, an electrical connection box having a locking construction K1 according to a first embodiment of the present invention. In FIG. 3, the electrical connection box includes a lower casing member 1 made of resin and an upper casing member 2 or an upper cover made of resin and having a top wall. The upper casing member 2 is mounted on the lower casing member 1 so as to cover an upper opening of the lower casing member 1. In order to facilitate directional description of the electrical connection box, it is to be noted that the arrow in FIG. 3 represents a forward direction. Thus, in FIG. 3, the lower casing member 1 has front and rear faces 1a and 1b, while the upper casing member 2 has front and rear faces 2a and 2b. Two upper locking portions 3 are integrally formed on the front face 2a of the upper casing member 2, while two lower locking portions 4 are integrally formed at positions on the front face 1a of the lower casing member 1 corresponding to those of the upper locking portions 3, respectively. Although not specifically shown in FIG. 3, another two upper locking portions 3 are formed on the rear face 2b of the upper casing member 2, while another two lower locking portions 4 are formed on the rear face 1b of the lower casing member 1.

The upper locking portion 3 projects slightly forwardly from the front face 2a of the upper casing member 2 and extends downwardly like an arm substantially in parallel with the front face 2a. A lower half of the upper locking portion 3 forks to leg portions 3a and 3b. Namely, the upper locking portion 3 has a two-forked shape. By this arrangement of the upper locking portion 3, the leg portions 3a and 3b can be separately deflected back and forth without affecting each other. Forwardly extending bosses 6a and 6b each having a wedgy sectional shape are, respectively, formed at lower ends of the leg portions 3a and 3b. Upwardly oriented engageable faces 10a and 10b are, respectively, formed on upper edges of bosses 6a and 6b. In each of the upper locking portions 3, the engageable faces 10a and 10b of the leg portions 3a and 3b are set such that the engageable face 10b of the right leg portion 3b is higher than the engageable face 10a of the left leg portion 3a by a distance d. Namely, the engageable faces 10a and 10b are of two-step configuration. The distance d ranges from 0.8 to 1.2 mm approximately. In order to clarify the distance d, the clearance d is illustrated exaggeratedly in FIGS. 3 to 6.

On the other hand, the lower locking portion 4 is formed into a boxlike shape having an upwardly opening hollow. A lateral width of the hollow is set widely such that the leg portions 3a and 3b can be inserted into the hollow simultaneously.

Figure 1:
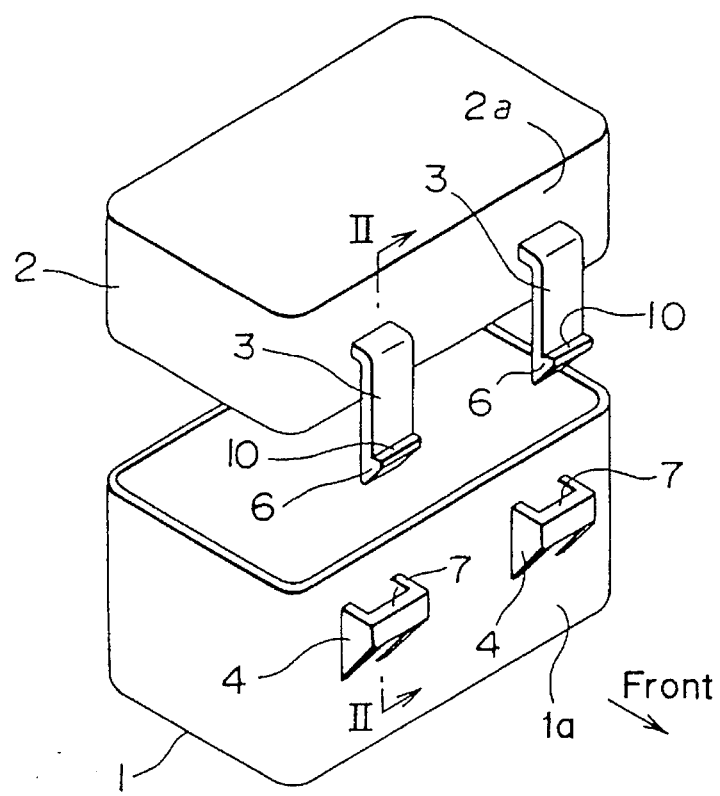
FIG. 1 is a perspective view of a prior art electrical connection box (referenced above)
Figure 2:
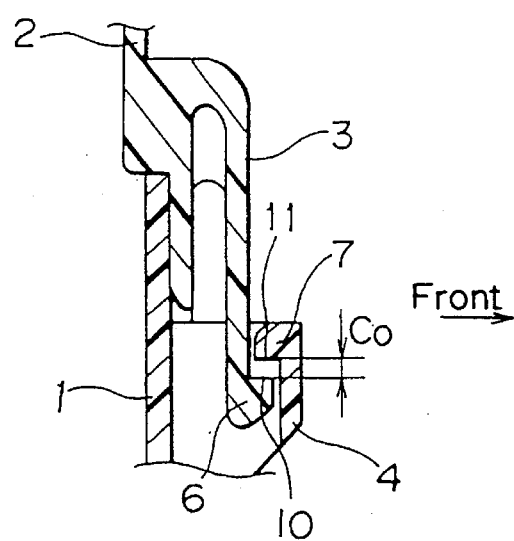
FIG. 2 is an enlarged sectional view taken along the line II—II in FIG. 1 and showing a locking portion of the prior art electrical connection box of FIG. 1 (referenced above)
Figure 4:
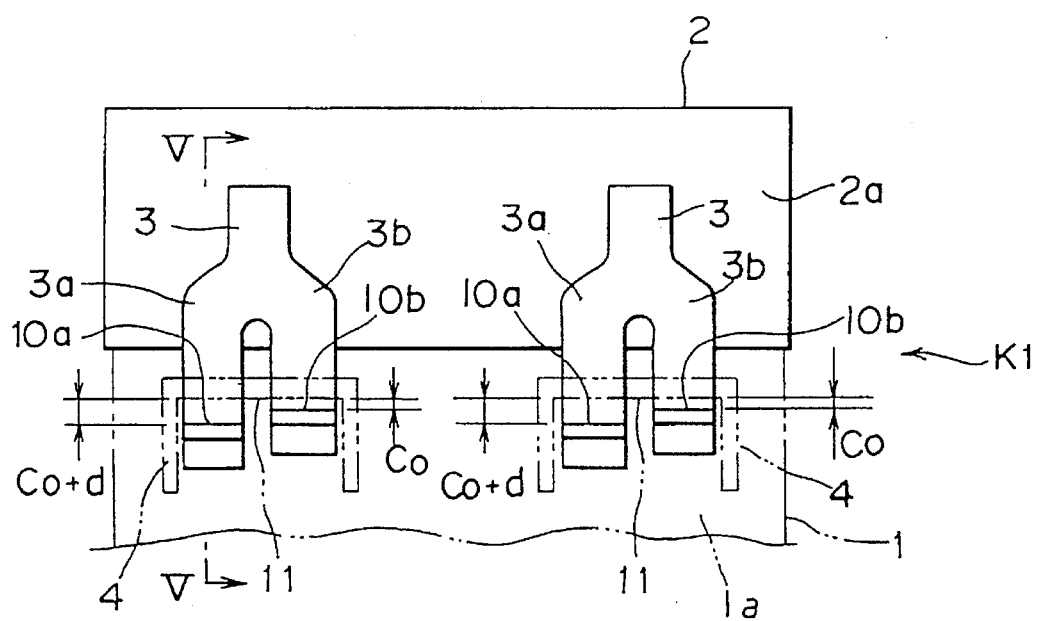
FIG. 4 is an enlarged fragmentary front elevational view of the electrical connection box of Fig. 3.

In FIG. 4, the upper casing member 2 is indicated by the solid line, while the lower casing member 1 is indicated by the imaginary line. A downwardly oriented mating engageable face 11 is formed on the lower locking portion 4 so as to have an identical height throughout width of the lower locking portion 4. The engageable face 10b of the right leg portion 3b is set such that a clearance Co of a known electrical connection box shown in Fig. 2 is formed between the engageable face 10b and the mating engageable face 11. Accordingly, a clearance between the engageable face 10a of the left leg portion 3a and the mating engageable face 11 is equal to a sum of the clearance Co and the distance d, namely, (Co+d).

Figure 5:
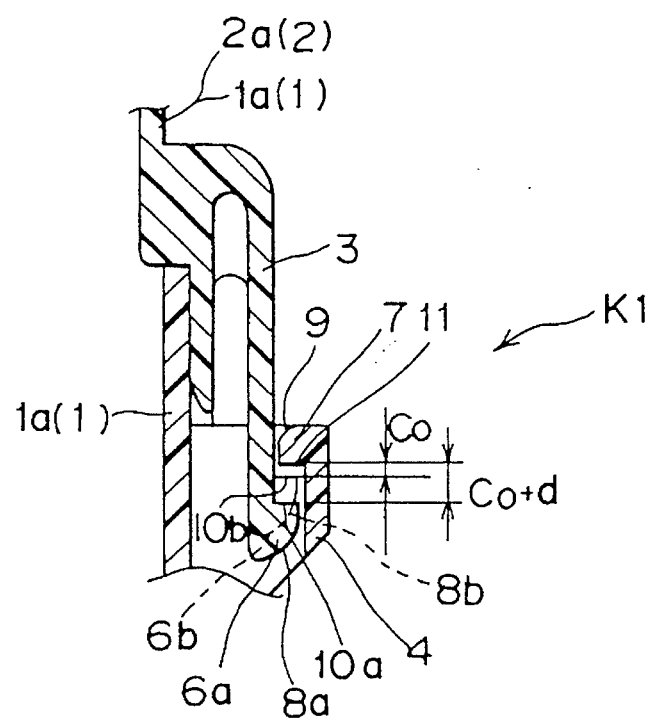
FIG. 5 is a sectional view taken along the line V—V in FIG. 4.

FIG. 5 shows the upper and lower locking portions 3 and 4 in detail. A rearward extending boss 7 having a wedgy sectional shape is formed on the lower locking portion 4. A downwardly extending oblique face 9 is formed at an upper rear portion of the boss 7 and the mating engageable face 11 referred to above is formed on a lower edge of the boss 7 so as to confront the engageable faces 10a and 10b. Meanwhile, upwardly extending oblique faces 8a and 8b are, respectively, formed at lower front portions of the bosses 6a and 6b.

Operation of the locking construction K1 is described, hereinbelow. When the predetermined clearance Co is maintained between the engageable face 10b and the mating engageable face 11, the higher engageable face 10b in the engageable faces 10a and 10b is brought into engagement with the mating engageable face 11 so as to hold the lower and upper casing members 1 and 2 in locking state. At this time, the lower engageable face 10a does not serve to lock the lower and upper casing members 1 and 2 to each other.

Figure 6:
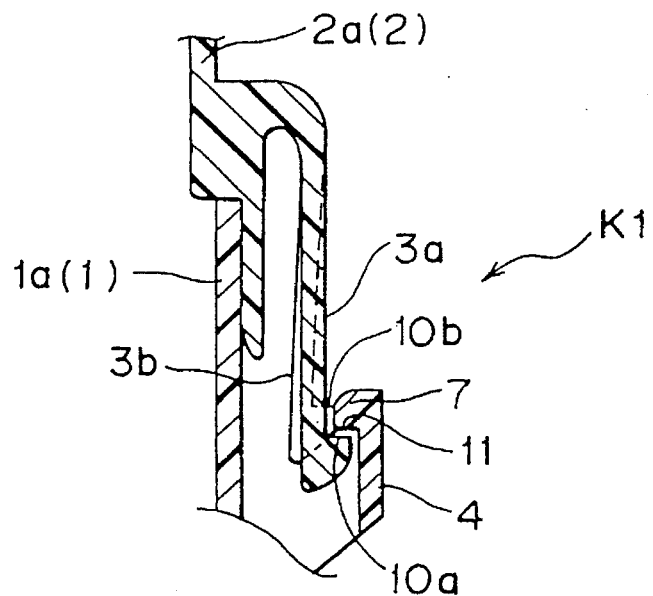
FIG. 6 is a view similar to FIG. 5, particularly showing an engagement state of the electrical connection box of FIG. 3 different from an engagement state of FIG. 5.

When the predetermined clearance Co is not secured between the engageable face 10b and the mating engageable face 11 due to deformation of the lower and upper casing members 1 and 2 at the time of their molding or distortion of the lower and upper casing members 1 and 2 at the time of their mounting on a vehicle body as shown in FIG. 6, the lower engageable face 10a in the engageable faces 10a and 10b is brought into engagement with the mating engageable face 11 so as to hold the lower and upper casing members 1 and 2 in locking state. At this time, the leg portion 3b having the higher engageable face 10b is brought into contact with the boss 7 of the lower locking portion 4 so as to be deflected rearward. However, since the upper locking portion 3 forks to the leg portions 3a and 3b, deflection of one leg portion 3b does not affect the other leg portion 3a and thus, it is possible to hold the lower and upper casing members 1 and 2 in locking state.

Figure 7:
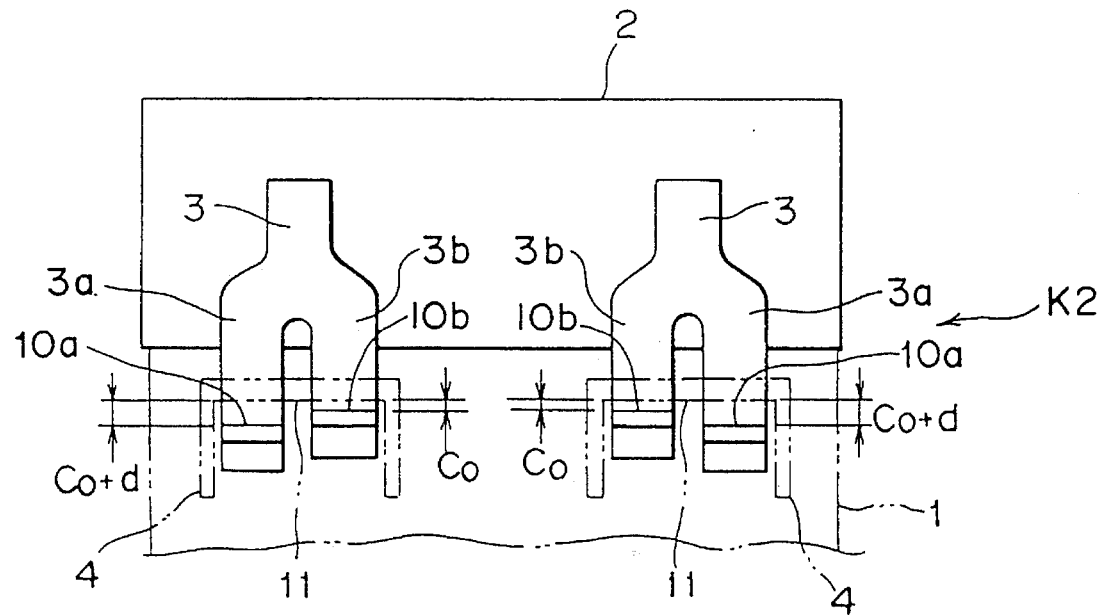
FIG. 7 is a view similar to FIG. 4, particularly showing a second embodiment of the present invention.

FIG. 7 shows an electrical connection box having a locking construction K2 according to a second embodiment of the present invention. In the locking construction K2, the upper locking portion 3 forks to the downwardly extending leg portions 3a and 3b and the engageable faces 10a and 10b formed on the leg portions 3a and 3b, respectively are of two-step configuration in the same manner as the locking construction K1. However, in the locking construction K2, shape of the right upper locking portion 3 is made laterally opposite to that of the left upper locking portion 3 in contrast with the locking construction K1. Namely, the leg portion 3b having the higher engageable face 10b is disposed at a right side of the left upper locking portion 3 but at a left side of the right upper locking portion 3 such that the leg portions 3b of the left and right upper locking portions 3 are disposed at laterally central portions of the upper casing member 2. Since other structures of the locking construction K2 are similar to those of the locking construction K1, the description is abbreviated for the sake of brevity.

When the left and right upper locking portions 3 each having a two-forked shape are arranged laterally symmetrically as shown in FIG. 7, the lower and upper casing members 1 and 2 are locked to each other at positions laterally symmetric to a laterally central position of the lower and upper casing members 1 and 2 even if either one of the higher and lower engageable faces 10b and 10a is employed for locking the lower and upper casing members 1 and 2. As a result, locking performance of the locking construction K2 is stabilized.

Figure 8:
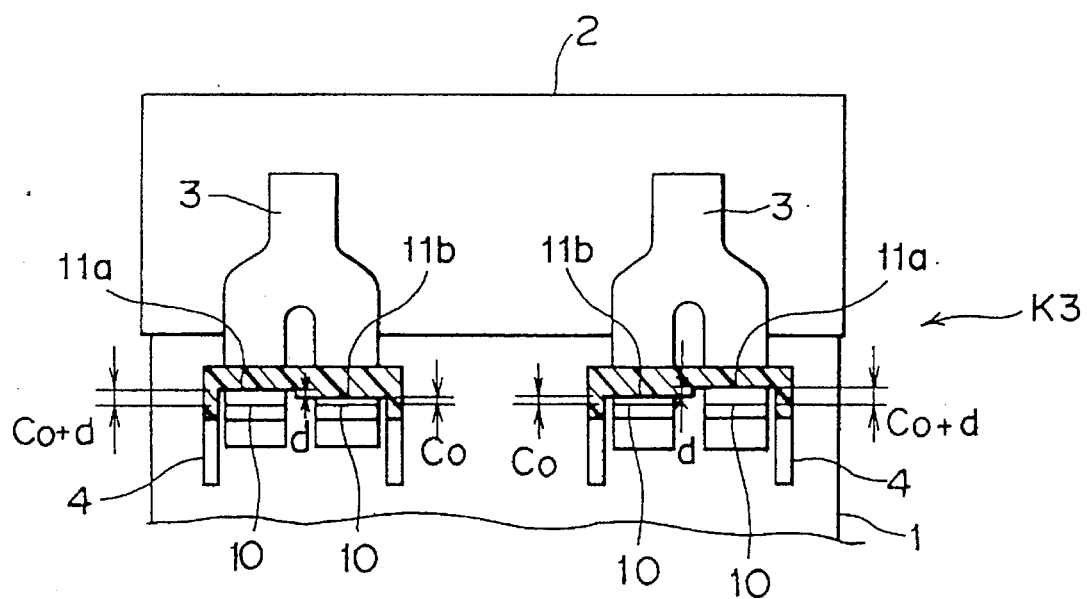
FIG. 8 is a view similar to FIG. 4, particularly showing a third embodiment of the present invention.

FIG. 8 shows an electrical connection box having a locking construction K3 according to a third embodiment of the present invention. In the locking construction K3, the upper locking portion 3 forks to the downwardly extending leg portions 3a and 3b but the leg portions 3a and 3b have engageable faces 10 of an identical height. On the other hand, stepped mating engageable faces 11a and 11b having a difference d in height therebetween are formed on the lower locking portion 4.

In the locking construction K3, the lower mating engageable face 11b is set such that the predetermined clearance Co is secured between the engageable face 10 and the lower mating engageable face 11b in the same manner as the known electrical connection box. Therefore, the upper mating engageable face 11a is set such that a clearance between the engageable face 10 and the upper mating engageable face 11a is equal to a sum of the clearance Co and the distance d, namely, (Co+d).

In the locking constructions K1 to K3, the upper locking portion 3 has a two-forked shape. However, alternatively, the lower locking portion 4 of the lower casing member 1 may have a two-forked shape.

As is clear from the foregoing description, the following effects (1) and (2) can be gained by the locking construction of the present invention.

(1) The engageable face of one of the upper and lower locking portions is formed by two engageable faces of two-step configuration such that the two engageable faces have the predetermined difference in height. The two engageable faces are arranged to be sequentially brought into engagement with the mating engageable face of the other of the upper and lower locking portions. Therefore, even in case the predetermined clearance is not secured between the engageable face and the mating engageable face due to deformation of the upper and lower casing members at the time of their molding or distortion of the upper and lower casing members at the time of their mounting on a vehicle body, one of the two engageable faces, which has a larger clearance relative to the mating engageable face than the other of the two engageable faces, is brought into engagement with the mating engageable face so as to hold the upper and lower casing members in locking state. Namely, even if the upper and lower casing members are deformed at the time of their molding or distorted at the time of their mounting on a vehicle body, the upper and lower casing members can be held in locking state accurately at all times and thus, no backlash in locking is produced.

(2) Furthermore, one of the upper and lower locking portions forks to two leg portions. Therefore, even if one of the two leg portions corresponding to the smaller clearance is deflected when the other of the two leg portions corresponding to the larger clearance is held in engagement with the other of the upper and lower locking portions, engagement of the other of the two leg portions with the other of the upper and lower locking portions is not affected by deflection of the one of the two leg portions, so that the upper and lower casing members can be held in locking state more positively.

What is claimed is:

1. A locking construction of an electrical connection box, comprising:

a lower casing member which is made of resin;

an upper casing member which is made of resin and is mounted on an upper portion of the lower casing member;

a first locking member which has a first engageable face and is provided on the lower casing member; and a second locking member which has a second engageable face engageable with the first engageable face and is provided on the upper casing member;

wherein one of the first and second engageable faces of the first and second locking members is formed by two engageable face sections having a predetermined difference in height therebetween such that the engageable face sections are sequentially brought into engagement with the other of the first and second engageable faces of the first and second locking members, and said first locking member comprises said engageable face sections and said second locking member forks to two leg portions extending towards the first locking member such that said second engageable faces having an identical height are, respectively, formed on said leg portions.

2. The locking construction of claim 1, wherein said predetermined difference in height between said engageable faces is in the range of from about 0.8 mm to about 1.2 mm.

3. The locking construction of claim 1, wherein each of said leg portions comprises a boss having a wedge sectional shape, at the lower end of said leg portions.

4. The locking construction of claim 1, wherein at least said engageable face of said first locking member, on said lower casing, is downwardly oriented.

5. The locking construction of claim 4, wherein said upper casing member comprises a front face lying in a generally vertical plane, and at least said engageable face of said first locking member on said lower casing member is substantially perpendicular to the plane of said front face of said upper casing member.

* * * * *